US009235853B2

(12) United States Patent
Weston et al.

(10) Patent No.: US 9,235,853 B2
(45) Date of Patent: Jan. 12, 2016

(54) METHOD FOR RECOMMENDING MUSICAL ENTITIES TO A USER

(75) Inventors: Jason Weston, New York, NY (US); Adam Berenzweig, Brooklyn, NY (US); Ron Weiss, New York, NY (US)

(73) Assignee: GOOGLE INC., Mountain View, CA (US)

( * ) Notice: Subject to any disclaimer, the term of this patent is extended or adjusted under 35 U.S.C. 154(b) by 583 days.

(21) Appl. No.: 13/610,715

(22) Filed: Sep. 11, 2012

(65) Prior Publication Data

US 2014/0074269 A1    Mar. 13, 2014

(51) Int. Cl.
*G06F 17/00* (2006.01)
*G06Q 30/02* (2012.01)

(52) U.S. Cl.
CPC .................. *G06Q 30/0282* (2013.01)

(58) Field of Classification Search
CPC .............. G06F 17/30743; G06F 17/30053; G06F 17/3053; G06F 17/30749; G06F 17/30772; G10H 2240/131; Y10S 707/99933; Y10S 707/99936
See application file for complete search history.

(56) References Cited

U.S. PATENT DOCUMENTS

| 7,313,571 | B1 * | 12/2007 | Platt et al. ............................. 1/1 |
| 2007/0038672 | A1 * | 2/2007 | Plastina et al. ............. 707/104.1 |
| 2008/0168059 | A1 * | 7/2008 | Hoashi et al. ..................... 707/6 |
| 2010/0325135 | A1 * | 12/2010 | Chen et al. .................... 707/759 |

OTHER PUBLICATIONS

Extended European Search Report for 13182162.1 dated Nov. 7, 2013.

* cited by examiner

*Primary Examiner* — Andrew C Flanders
(74) *Attorney, Agent, or Firm* — Morris & Kamlay LLP (57) ABSTRACT

Methods, systems, and computer programs are presented for recommending music entities to a user. One method includes defining a set of labels with each label identifying a music concept and constructing at least vector for each of a plurality of entities based on source data. Each vector includes the set of define labels and each label is assigned with a label score. Two vectors respectively associated with two of the plurality of entities are compared. The method further includes generating a recommendation action based on comparison result of the two vectors and transmitting the data for the recommendation action to a device of the user. In one example, the comparisons can be pre-computed and used for the recommendation action.

23 Claims, 6 Drawing Sheets

METHOD FOR RECOMMENDING MUSICAL ENTITIES TO A USER

BACKGROUND

Internet applications have grown tremendously over the years and so has the functionality provided to devices that access those applications. One area that has seen such growth relates to audio file management. An audio file management application enables a user to search and purchase music selections online and store the purchased music in cloud storage. The audio file management application may further enable a user to access and play the music stored in the cloud storage by using a network connected device.

SUMMARY

Embodiments of the present disclosure provide methods, systems, and computer programs for recommending musical entities to a user. It should be appreciated that the present disclosure can be implemented in numerous ways, such as a process, an apparatus, a system, a device or a method on a computer readable medium. Several inventive embodiments of the present disclosure are described below.

In one embodiment, a method for recommending musical entities to a user is disclosed. The method includes defining a set of labels with each label identifying a music concept. The disclosed method further includes constructing at least one vector for each of a plurality of entities based on source data. In one embodiment, each of the plurality of entities identifies a user, an album, an artist, or a music track. In one embodiment, the source data is obtained from the data stored in the user records and the music records. Two of the constructed vectors respectively associated with two of the plurality of entities are compared. Based on the comparison result of the two vectors, a recommendation action is generated. The data for the recommendation action is transmitted to a device of the user.

In another embodiment, a system for recommending musical entities to a user is disclosed. The disclosed system includes a vector constructor and a recommendation framework. The vector constructor is configured to construct at least one vector for each of a plurality of entities based on source data. Each vector includes a set of defined labels and each label identifies a music concept and is assigned a label score. The recommendation framework is configured to compare two of the constructed vectors respectively associated with two of the plurality of entities. The recommendation framework is further configured to generate a recommendation action based on the comparison result of the two vectors.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

DETAILED DESCRIPTION

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in a simple block diagram format in order to avoid unnecessarily obscuring the present disclosure. Thus, the specific details set forth are merely exemplary. Particular implementations may vary from these exemplary details and still be contemplated to be within the spirit and scope of the present disclosure.

Reference in the description to "one embodiment" or "an embodiment" means that a particular feature, structure, or characteristic described in connection with the embodiment is included in at least one embodiment of the disclosure. The appearances of the phrase "in one embodiment" in various places in the specification do not necessarily all refer to the same embodiment.

Embodiments of a method and a system are described for recommending musical entities to a user. In one embodiment, the disclosed method may define a set of labels with each label identifying a music concept. At least one vector is constructed for each of a plurality of musical entities, or entities, based on source data. Each vector includes the set of define labels and each label is assigned with a label score. In one embodiment, an entity may identify a user, an artist, an album, or a music track. The source data may be obtained from the data stored in user records, music data, metadata, and other data sources. The similarity between two entities may be measured by comparing two vectors respectively associated with two of the plurality of entities, based on use context of the user. In one embodiment, the comparison between the two vectors respectively associated with the two entities may be conducted by computing the cosine similarity between the two vectors. In one embodiment, the use context of the user is obtained from activities or actions of the user. The user activities of the user may produce one or more seed tracks, one or more seed albums, one or more seed artists, or a given user music profile. User activities can include actions taken by a user to listen to his music stored and managed by a cloud music service. A recommendation action may be generated based on the comparison results of the two vectors and the data for the recommendation action may be transmitted to a device of the user. In one embodiment, the processing of the recommendation is completed on a server of the music service provider, and the transmission of the recommendation to the user's device may include presenting the recommendation on a user interface (UI) provided by the music service provider. In such an embodiment, the user receives the recommendation on the device that has network access to the service provider and is therefore able to render the UI on the accessory device.

Figure 1:
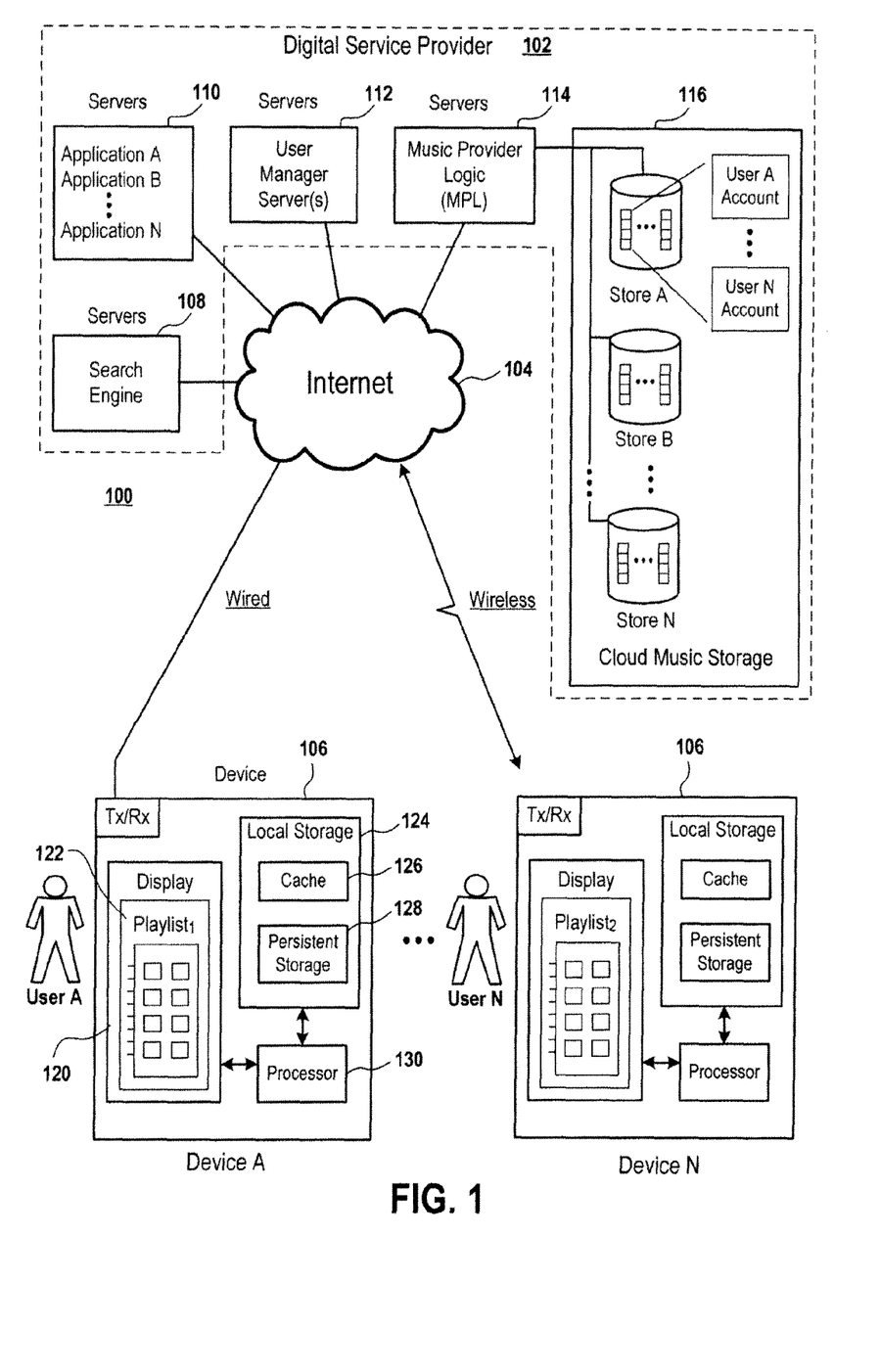
FIG. 1 illustrates a system diagram for enabling access and playing of music files stored in a cloud music storage, in accordance with one embodiment of the present disclosure.

FIG. 1 illustrates a system diagram 100 for enabling access and playing of music files stored in a cloud music storage, in accordance with one embodiment of the present disclosure. The system 100 includes a plurality of servers that are connected to the Internet 104. The plurality of servers and storage are, in one embodiment, part of a digital service provider 102. The digital service provider 102, is a system that can include a plurality of servers that can provide applications, services, digital content, and interconnectivity between systems, applications, users, and social networks. For example, the digital service provider 102 can include a search engine 108, a plurality of servers 110 that provide applications for various business, social, and technology related subject matter, servers that provide user management 112, and servers to provide music related services 114.

One example digital service provider 102 can be Google Inc., of Mountain View Calif. Other digital service providers can be more focused to provide only specific services, while others provide a variety of services for access, download, viewing, searching, etc. The content can vary greatly, but is commonly presented in digital format and displayed on monitors or screens of devices, computers, smartphones, tablets, etc.

The servers that provide music related services, in one embodiment, are illustrated by the music provider logic 114, that executes over one or more servers that are connected to the Internet 104. The music provider logic 114 is shown connected to a cloud music storage 116. Cloud music storage 116 is shown to include a plurality of storage systems, identified as store A, store B, and store N. The various storage systems that hold music data and music metadata, are provided with fast access to the Internet, for providing music data on demand to users requiring access to their music accounts stored in cloud music storage 116. In one embodiment, users can access the cloud music storage 116 by way of a plurality of devices 106. The plurality of devices can include any type of device having a processor and memory, wired or wireless, portable or not portable. In the example illustrated in FIG. 1, user A is shown to have device 106 (device A). Device 106 is shown to include communication logic for transmitting and receiving data between device 106 and the Internet 104.

The communication logic (Tx/Rx) can include various types of network interface circuitry, radio-communication (e.g. wireless), cell tower communication, or interconnected wiring connected to Internet service providers. Device 106 is also shown to include a display having a screen 120, local storage 124, and a processor 130. Local storage 124 can include cash memory 126, persistent storage 128, and other logic. In this example, device 106 is shown to include graphical icons (e.g., graphical user interfaces GUIs) that represent a play list. The screen 120 can be a touch-screen, or a display typically provided by a flat-panel display, a cathode ray tube (CRT), or other media capable of rendering a display. Still further, device 106 can have its display separate from the device, similar to a desktop computer or a laptop computer. Still further yet, device 106 can be in the form of a smartphone, a tablet computer, or hybrids that provide touch screen capability in a portable form factor. One example device can include a portable phone device that runs an operating system and is provided with access to various applications (apps) that may be obtained over the Internet, and executed on the local portable device (e.g., smartphone, tablet, laptop, desktop, etc.).

In one embodiment, the user of device 106 can install an application that provides cloud storage of music files, and access to the storage cloud music files from the device 106. Once the user's music files are uploaded to the cloud music storage 116, the user's music files are associated to a library of the user. In one embodiment, a plurality of users can access the same application and can upload their own music files to create their own library, which will be stored in the cloud music storage 116.

Each of such users can then access the cloud music storage 116 through an application on their device 106 to render and play selected music files on their device, when the device 106 has access to the Internet and associated servers of the music provider logic 114 and cloud music storage 116. Accordingly, users can access the music application on their device 106, access all music files stored in cloud music storage 116, arrange music titles in their music library into playlists, add music to the cloud music storage 116, delete music from the cloud music storage 116, and purchase music that is added to the cloud music storage 116. These changes are maintained and managed by the music provider logic 114 and the music provider logic 114 will provide access to the various users to their music files stored in the cloud music storage 116, based on their selections during use of the application.

Figure 2:
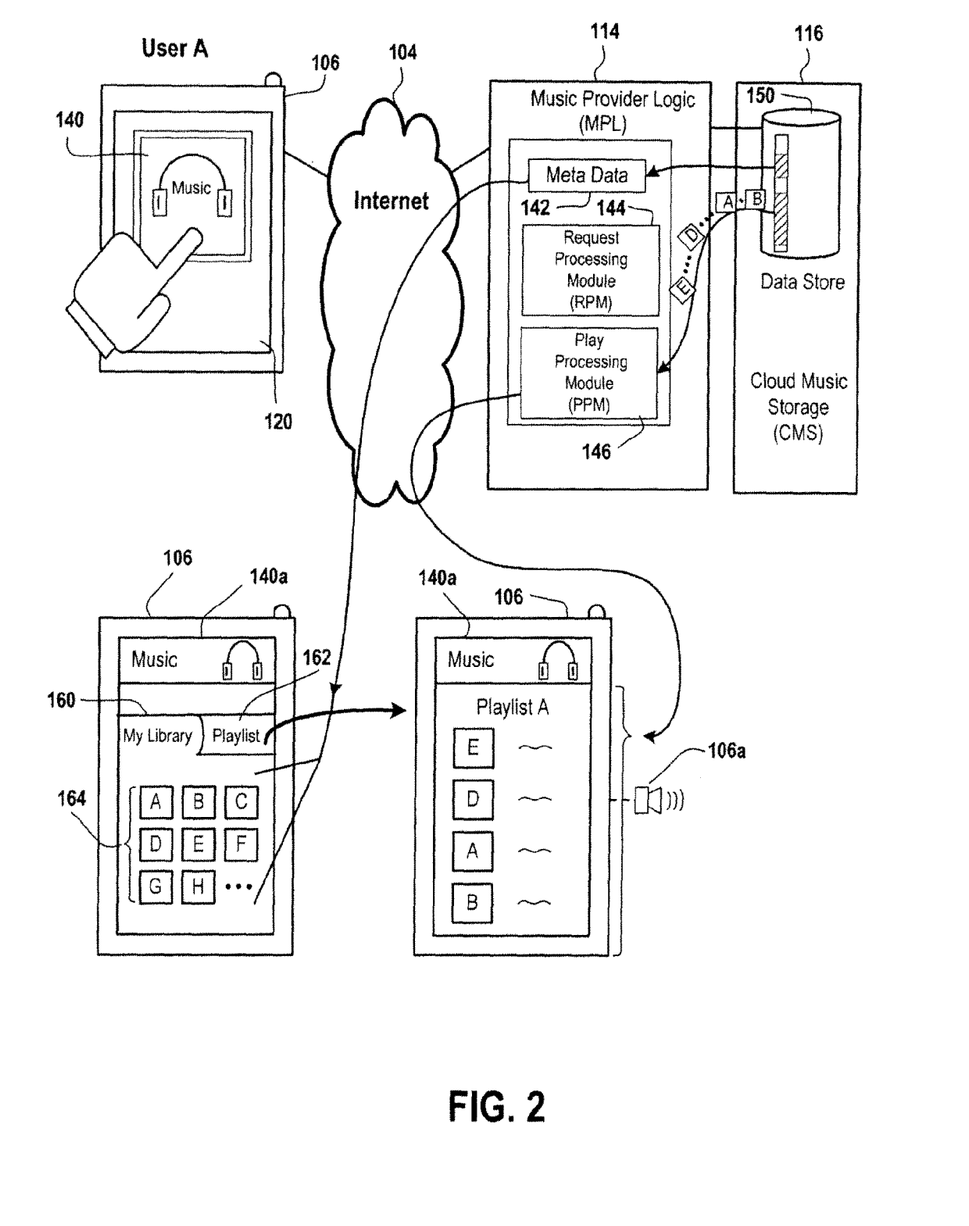
FIG. 2 illustrates how user A utilizes a device (e.g. smartphone) to access his music account stored in the cloud music storage (CMS), in accordance with one embodiment of the present disclosure.

FIG. 2 illustrates how user A utilizes a device 106 (e.g. smartphone) to access his music library stored in the cloud music storage (CMS) 116, in accordance with one embodiment of the present disclosure. As shown, the device 106 will include a screen 120, and associated graphical icons that present a thumbnail of an application 140, associated with a music application. Application 140, as described herein, relates to an application that provides a user with access to his or her music library which has been previously added to the cloud music storage 116. If the user is a new user to the application 140, the new user can download application 140 to device 106 from at least one server 110 of the digital service provider 102.

Once the application 140 has been downloaded and installed on device 106, the icon representing application 140 will be rendered on the display screen of device 106. Initially, the user will be prompted to select music to add to the cloud music storage 116. The music may be added from files currently maintained by the user on his or her device 106, on other devices of the user such as computers, other smartphone and or tablets, or other storage media. Additionally, the user can add music files that may be part of a music library maintained by another application. The other application may maintain a specific format for the music, and the music can be obtained and translated to standardize music files for addition to the cloud music storage 116.

Once the user has managed his library to add, modify, or adjust the music files present in the cloud music storage 116, the user can access application 140 and various options from graphical user interfaces provided on the screen 120 of device 106. In the illustrated example, device 106 will open application 140 through various graphical user interface screens, such as interface 140a. Interface 140a can include various menus, selection icons, configuration icons, displays, advertisements, buttons, listings, etc. In this example, the interface 140a may include an image that lists the users library 160, the users playlists 162, and music title icons 164. Music title icons can be represented by graphical artwork that represents artwork associated with the various music files present in the users library. The users library is illustrated by music title icons 164, shown as A-H.

The music title icons 164 are rendered on the screen 120 upon obtaining metadata from the cloud music storage 116

(or accessing the metadata from previous download(s) stored locally on the user device), which may be present in data store 150. Music provider logic 114 will include request processing module 144 that manages the requests and communication between various users applications 140 and the cloud music storage 116. The request processing module (RPM) 144 is also in communication with a play processing module (PPM) 146. In order to render the title icons 164 on the screen of the device 106, the music provider logic 114 will utilize the request processing module 144 to obtain metadata 142 from the data store 150.

The metadata 142 will be the metadata associated with the various music files stored in data store 150. The metadata 142 provides information regarding each of the titles stored in the cloud music storage 116, and sufficient information to render the title icons 164 on the screen of device 106, and provides text information, duration information, genre information, and other data that describes aspects or characteristics of the music files. As shown, when the user selects play list 162 on device 106, a play list graphical user interface is shown identifying particular songs that have been arranged by the user.

Playlist A, part of the playlist 162, represents various songs that were selected by the user. The user can have various playlists, and the selection of playlist A is only provided as one example of a playlist that includes music files that are played in the order E→D→A→B. Once the user selects a corresponding play button or clicks on one of the audio files in the playlist, the music files will begin to play, via the speaker 106a, in the order arranged and defined by the user in his or her playlist A.

Figure 3:
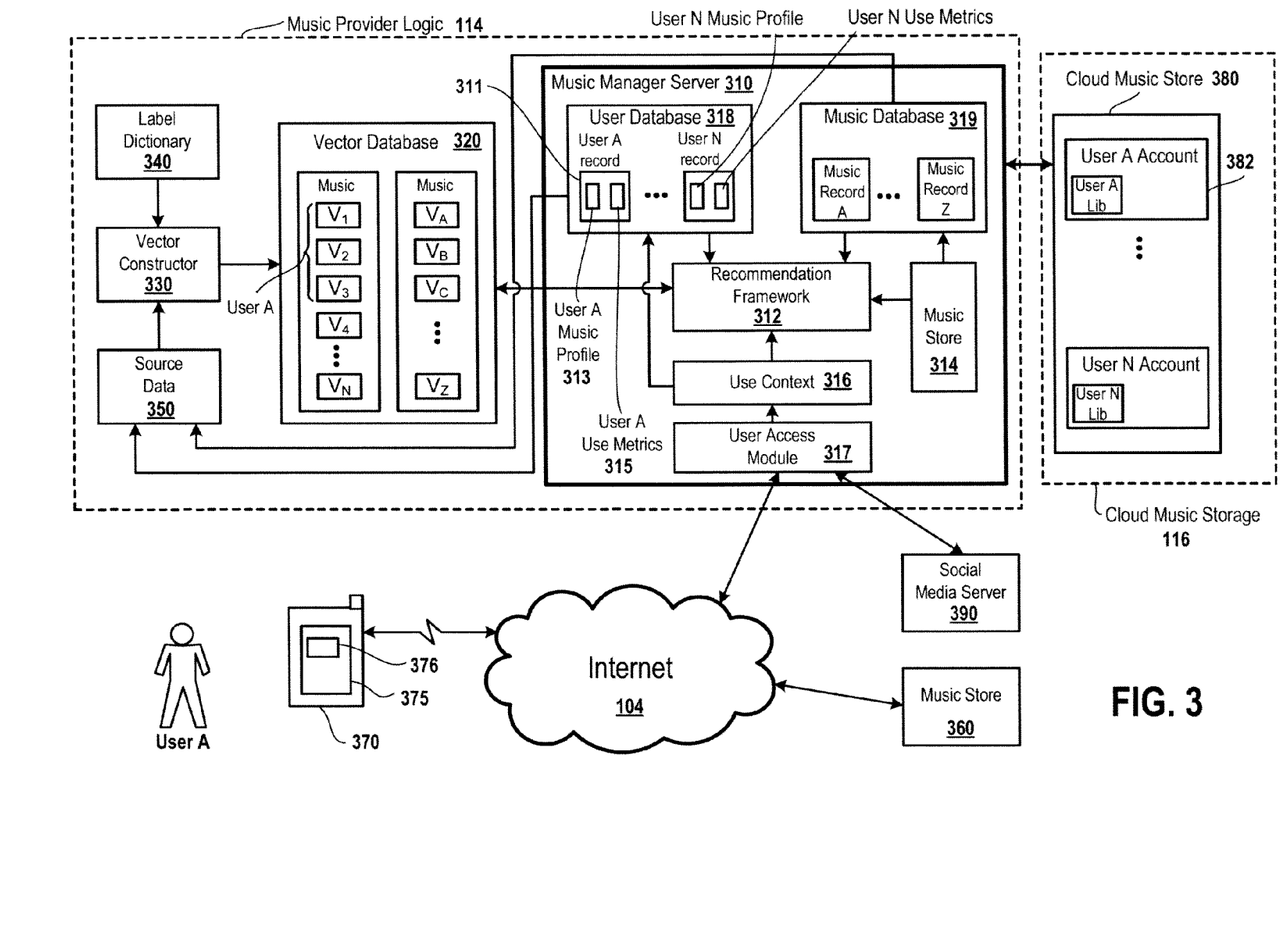
FIG. 3 illustrates a system diagram for recommending musical entities to a user, in accordance with one embodiment of the present disclosure.

FIG. 3 illustrates a system diagram 300 for recommending musical entities to a user, in accordance with one embodiment of the present disclosure. The system 300 includes a music manager server 310, a vector database 320, a vector constructor 330, a label dictionary 340, source data 350, a music store 360, a cloud music store 380, and a social media server 390.

In one embodiment, the music manager server 310, the vector database 320, the vector constructor 330, the label dictionary 340, and the source data 350 are part of the music provider logic 114, and the cloud music store 380 is part of the cloud music storage 116, as shown in FIG. 1. In other embodiments, the music manager server 310, the vector database 320, the vector constructor 330, the label dictionary 340, and the source data 350 may be defined from separate processing systems. For example, the music manager server 310 may be stored in a separate processing system to be accessed by users over the internet 104, and the vector constructor 330 may work in conjunction with or in coordination with the music provider logic 114.

The label dictionary 340 may be used to store a set of defined labels. A label identifies a music concept, or a tag, used to describe one of characteristics of a musical entity. Some examples of labels, without limitation, include "techno," "jazz," "sad," "angry," "fast," "slow," "guitar," "flute," etc. Labels may also be grouped based on categories. For example, "techno" and "jazz" may be grouped under the category of "musical genres," and "angry" and "sad" may be ground under the category of "moods," etc. Other examples of possible categories of labels are "tempo," "beat," "vocals," and "instruments."

There are several ways to define the labels stored in the label dictionary 340. In one embodiment, a fixed set of labels may be chosen and defined by a human annotator or a group of annotators working in unison agreement. In another embodiment, a set of labels may be defined based on user "tags" for musical entities, e.g., epithets given by users to musical entities. If the process is annotated to process user tags, additional processing can be performed to produce a unique set of labels, and tag duplication can be removed. Alternatively, tags may be collected automatically from online documents. For example, selected adjectives that appear in music reviews may be used for label definitions. It is to be understood that a hybrid method, e.g., a combination of the above-identified methods, may be utilized to define the labels stored in the label dictionary 340.

A musical entity, or an entity, identifies a music track, a music album, an artists, a user, and other identities associated with music. In one embodiment, one vector may be associated with an entity. In another embodiment, two or more vectors may be associated with an entity.

In one embodiment, a vector may include a label name notation portion and a label score portion. The label name notation portion includes a set of defined labels, and each defined label in the vector is assigned a label score that indicates a degree of match with a corresponding label in other vectors. A vector associated with an entity gives a "signature" for that entity. In one embodiment, if the set of defined labels stored in the label dictionary 340 are of size D, a vector may be constructed to include D labels, i.e., the constructed vector is a D-dimensional vector for a musical entity.

For example, a music track, being an "entity" could be represented by a vector as "jazz:1 flute:1 happy:1 sad:0" V=[1, 1, 1, 0]. In this example, the vector V has four dimensions. However, in some embodiments the vector V can have up to thousands of labels, i.e., dimensions (i.e., V=[A, B, D, D, . . . N]). The label score of "0" means no match and the label score of "1" means a full match, although the label score may be normalized differently. Additionally, the scores may vary anywhere between 0 and 1, where for example, 0.2 might be closer to no match and 0.75 might be closer to a full match. Label scores for an entity that identifies a user may be interpreted as the user's preferences for the given labels, for example, a user who likes jazz, flute, and so on.

In one embodiment, one may manually assign a label score, or a score, to a label. For example, one could count the number of times a given artist is tagged by users with a given label to generate a score for this given label. In another embodiment, a score may be generated by using collections of documents, for example, by counting the number of co-occurrences of a given label and a given musical entity across a large set of documents. Alternatively, a score may be assigned by predicting tags using a machine learning model. It is to be understood that a score may be assigned by using other methods, such as a combination of the score assigning methods discussed above. Again, the score need not be fixed to 0 or 1, but can be any number in between.

In still another embodiment, a machine learning can be used, which can take input features of a given musical entity and predicts scores for each label. In one embodiment, a training set of musical entities with known label scores may be used to train a machine learning model. The machine learning method may either use a collection of D separate models with each model trained to predict a score for a label in a D-dimensional vector, or use one machine learning model that predicts the scores for all labels in the D-dimensional vector.

The inputs to a machine learning model may come from various sources, including, but not limited to, features representing the audio content of a musical entity. For example, one may use Mel-frequency Cepstral Coefficients (MFCCs) or Stabilized Auditory Images (SAIs) to extract musically-relevant features from audio. Audio features may be used directly for scoring tracks, but may also be used to predict labels for higher-level entities, such as artists, albums, and users.

In one embodiment, the inputs to a machine learning model may be obtained from collaborative filtering type features, e.g., the play counts or star ratings (e.g., likes, dislikes, thumbs up, thumbs down, +1, etc.) given by a user or a group of users. In one embodiment, the data may be obtained from social network data or data obtained from various sites on the internet or data stores. Alternatively, the inputs to a machine learning model may be obtained from the features representing textual contents of a musical entity. For example, a textual description of an album, album reviews, metadata, etc. In another embodiment, the inputs to a machine learning model may be acquired from the certain features of metadata for a musical entity, for example, the country of origin of a given artist. In one embodiment, the inputs to a machine learning model may be obtained from the features representing known labels for an entity. For example, users may have already tagged an entity as "hard rock," which may be used as an input feature for the machine learning method to predict label scores. The inputs to a machine learning model may also be acquired by using a hybrid method, i.e., a combination of the input obtaining methods discussed above.

In one embodiment, the entities that identify users, albums, or artists are considered as higher level entities than the entities that identify tracks. Certain features, namely those derived from audio, are only available at the track levels. In order to predict label scores for the higher level entities, one method may include aggregating the track features over all associated tracks. In one embodiment, the track level vectors may be normalized before the aggregation by the prevalence of each defined label in a database. In one embodiment, tracks may be aggregated to a single vector or to multiple vectors associated with an entity, for example, by first clustering the track vectors and then aggregating each cluster into a label vector.

In one embodiment, when aggregating label scores of a D-dimensional vector associated with an "entity" that identifies an "Album A", it will be necessary to review the vector scores of all the entities that are associated with the entity "album." For instance, the tracks of an album themselves are entities, and thus, also have vectors. For example, Table 1 below shows examples of entities and vectors. The label data shown for each label is not an actual number utilized for a computation, but instead these numbers are only provided to show how label data in each vector for an entity of a given dimension D=10 can vary.

TABLE 1

| Entity | Vector | Label Scores, 10 Dimension (D = 10) |
|---|---|---|
| Album (A) | $V_1$ | [(0) (0.2) (1) (0.72) (0) (0) (0.6) (0) (0) (0)] |
| Track 1, Album (A) | $V_2$ | [(0) (0) (0) (0.52) (0) (1) (0) (1) (0) (0)] |
| Track 2, Album (A) | $V_3$ | [(0) (1) (0) (0) (0) (0.3) (1) (0) (0) (1)] |
| ⋮ | ⋮ | ⋮ |
| Track n, Album (A) | $V_n$ | [(1) (0) (0) (0) (1) (0.2) (1) (1) (0) (0)] |

In one example, the vector $V$, for Album A may consider features of all of the tracks (e.g., tracks 1-n) of the album. In another embodiment, each track may be considered in turn to predict the label scores for the labels in the D-dimensional vector for that track, and then assign an averaged vector V over all tracks as the vector for the album. This simplifies the score assigning operation, because only the training data and the machine learning model for tracks, not albums, are needed.

In another embodiment, when aggregating label scores for an entity that identifies an artist, one may aggregate from all of the tracks associated with the artist, similar to the exemplary method discussed above for aggregating label scores for an entity that identifies an album.

Similarly, for an entity that identifies a user, one may use the audio features from all or selected tracks the user likes or has listened to, or all of the tracks in the user's music collection to build a feature representation from all the combined audio. Alternatively, each track the user likes may be considered in turn to predict label scores for the D-dimensional vector associated with that track and the averaged vector over all tracks is assigned as the vector for the user. This method would simplify the system because only the training data and the machine learning model for tracks, not for users, are needed. For example, if known "scores" (e.g., star ratings, play counts, or play timestamps) for each track the user likes exist, then a weighted average of vectors using these scores could be performed.

Referring back to FIG. 3, in one embodiment, the source data 350 is utilized to obtain data from both the user records stored in the user database 318 of the music manager server 310 and music records stored in the music database 319 of the music manager server 310. Each, or selected user records in the user database 318 may be used to store the user activities conducted by a user who processes a music account. In one embodiment, the user records stored in the user database 318 may be updated or periodically updated based on the user activities.

The music database 319 may be utilized to store music records. A music record may include data representing an entity, and the entity may be a track, an album, an artist stored in a user's music library and/or in the music store 314 of the music manager server 310, etc. Certain metadata about a song can also define an entity, and a corresponding vector can be constructed for that entity. In one embodiment, the music database 319 may also be utilized to store music records for the musical entities in the music store 360 provided by third party digital service providers. Although FIG. 3 shows two separated databases to be used to store the user records and the music records, respectively, it is to be understood that the user records and the music records may be stored together in one integrated database or in three or more databases.

The vector constructor 330 may be utilized to construct vectors for entities, such as users, tracks, albums, artists, etc., based on the information provided by the source data 350 and the defined labels stored in the label dictionary 340. The constructed vectors may be stored in the vector database 320. As illustrated in FIG. 3, the vector database 320 may store the constructed vectors in either the users group or the music group. The vector constructor 330 will, in one embodiment, construct a vector of dimensions for all entities, where the number of dimensions is the same for all entities. For example, if the dimension is equal to 2000 dimensions, all entities for which the vector constructor 330 constructs a vector will include 2000 dimensions. As noted above, each dimension of the 2000 is associated with a label from the label dictionary 340. Certain entities may not produce data for certain labels, and in such a case, the label in the vector is populated with 0. Thus, no matter what the entity is, a vector can be constructed for that entity, where each label in the vector is assigned a number between 0 and 1. Comparison for similarity among entities can then be simplified, as all entities have the same size vector of X dimension.

Each entity may be associated with more than one vectors and the number of vectors associated with each entity may be different. For example, an artist who produces two types of music, one that is more pop-oriented and the other is more folk-oriented, may be associated with two vectors. That is, two or more vectors can be constructed by vector constructor 330 for a given entity. Similarly, a user who enjoys classical music, pop music, and rock music may be associated with three vectors. For example, vectors V1, V2, and V3 in the user group of the vector database 320 may be associated with user A.

Referring back to FIG. 3, the music manager server 310 includes a recommendation framework 312, a music store 314, use context 316, a user access module 317, a user database 318, and a music database 319. The user access module 317 may be used to handle a user's music account login request and to communicate the user login information and to allow input by the user to define a use context 316. The use content 316 may be what the user is accessing, which songs are being listened to, the play lists being created, etc. In one embodiment, the user access module 317 has access to a social media server 390 that maintains a plurality of social network user profiles. A user may chat with his social network friends while listening to music or performing other online activities. Although FIG. 3 illustrates one user (user A) who accesses the services provided by the music manager server 310, it is to be understood that in practice, many more users may access the services provided by the music manager server 310, and the service can be widely distributed across a network.

Once a user has logged into his music account online, the use context 316 collects the user activities, e.g., while the user is accessing the services over the internet 104. The user activities include, but not limited to, songs being played or have been played by the user, songs browsed or purchased by the user, music topics chatted by the user with his social friends, etc. The online music may also be purchased from the music store 314, which can be associated or connected to the music manager server 310. Alternatively, the online music may be purchased from the music store 360 provided by another digital service provider, or online retailer. In one embodiment, the use context 316 may maintain a separate record for each user who has logged into his music account. For example, after user A has logged into his music account 382, the use context 316, with permission of the user, may start to collect user A online activities which can be saved in a user A record. In one embodiment, the use context 316 may send the collected user activities to the recommendation framework 312, which in turn sends the collected user activities to the user database 318 to be stored. Alternatively, the use context 316 may transmit the collected user activities to the user database 318 directly.

In one embodiment, the user activities collected by the use context 316 may result in one or more seed tracks to be used for recommending musical entities. For example, a seek track may be a song from the user's music collection stored in the user's music library the user is listening to. The recommendation framework 312 compares the vector(s) associated with the seed track with the vectors associated with other music tracks either in a user's own music library or in any of the online music stores to generate a playlist, or suggest music to buy.

In another embodiment, the user activities collected by the use context 316 may result in one or more seed artists to be used for recommending musical entities. For example, the seed artist may be an artist whose web profile is being visited by the user. The recommendation framework 312 may compare the vector(s) associated with the seed artist with the vectors associated with other artists to generate a recommended list of artists having similar music styles.

In yet another embodiment, the user activities collected by the use context 316 may result in one or more seed albums to be used for recommending musical entities. For example, when a user reads a description page about an album, the described album may be consider a seed album. The recommendation framework 312 compares of the vector(s) associated with the seed album with the vectors associated with other albums to generate a list of links to related albums.

In still yet another embodiment, the user activities collected by the use context 316 may result in a user music profile. The given user music profile may provide the knowledge of the user's music collection, created playlists, favorite music, music play counts, etc. The recommendation framework 312 may compare the vector(s) associated with the given user music profile with the vectors associated with other musical entities so that the artists, albums, or tracks that suit the user's taste, but are yet in the user's collection, may be recommended.

In one embodiment, the seed tracks, seed artists, seed albums, or information from a given user music profile may be collected by the use context 316 by examining the online chats conducted by a user (after obtaining permission of the user) with his social network friends. The social media server 390 may maintain a plurality of user social network profile showing the lists of respective social network friends.

Based on the user activities provided by the use context 316, the recommendation framework 312 measures the similarities between two entities to generate a recommendation or action for the user. The similarities between two entities are measured by comparing the vectors associated with the two entities. For example, the similarity between two entities may be measured by computing the cosine similarity between the two vectors respectively associated with the two entities. If the comparison result is a score of "1," the two entities are very similar. Otherwise, if the comparison result is a score of "0," the two entities are dissimilar. It is to be understood that in addition to the cosine similarity method, other similarity measures, such as dot product, Euclidean distance, L-1 distance, etc., may be utilized to measure the similarity between two entities. In one embodiment, the recommendation framework 312 may be used to perform the vector comparison computation and generate a recommendation action accordingly. In such an embodiment, the recommendation framework 312 would access the vectors from vector database 320 and then perform the processing of the vectors to identify similarities.

In one embodiment, the recommendation framework 312 may measure the similarities between one entity in a first database and each of a plurality of entities in a second database by comparing the respective vectors associated with those entities. The vector comparison results may be saved and used to score the second database. For example, for an entity representing a given user in a user database, the recommendation framework 312 may measure the similarities between this user entity in the user database and each of the music artist entities in a music artist database by comparing the vector(s) associated with this user entity with the respective vectors associated with the music artist entities in the music artist database, and save the comparison results. In one embodiment, the saved comparison results may be used to score the music artist database for this given user. In another embodiment, the saved comparison results may be used by the recommendation framework 312 to recommend top matched artists to the given user. Accordingly, the comparison operations can be performed in advance (e.g., pre-computed) of any user access. When a user accesses a music site, the pre-computed comparisons for similarity could be accessed to present the user with a plurality of recommendations. The recommendations could be customized for each user, and for each user, the recommendations could be tailored for the particular type of music that the user is currently listening to or viewing in the digital library. In still another embodiment, the comparisons can be partially performed in advance, saved to storage and used for recommendations and some comparisons performed in real-time, based on user activity context.

As discussed above, the user database 318 may be used to store a plurality of user records with each user record being associated with a user and documenting the user's activities. In one embodiment, each user record includes a user music profile portion and a use metrics portion. For example, the use metrics 315 of the user A record is used to document user A's activates. The user A music profile 313 of the user A record lists the user A's music collections, created playlists, favorite songs, play counts for each songs in user A's music collection, etc. The music in the user A's music collections may be stored in the user A library of the user A account 382 in the cloud music store 380. In one embodiment, the user database 318 communicates with the cloud music store 380 so that the user libraries of the various user accounts stored in the cloud music store 380 may be updated.

In one embodiment, the recommendation action generated by the recommendation framework 312 may be transmitted back to the user's device. For example, after the recommendation framework 312 has generated a recommendation action 376 for user A, the recommendation action 376 is transmitted back to user A's device 370 to be displayed at the display screen 375 (e.g., or a user interface (UI) of a screen display produced by the service provider). In one embodiment, the recommendation action may be transmitted via the user access module 317 to the UI used to access the music service online.

Figure 4A:
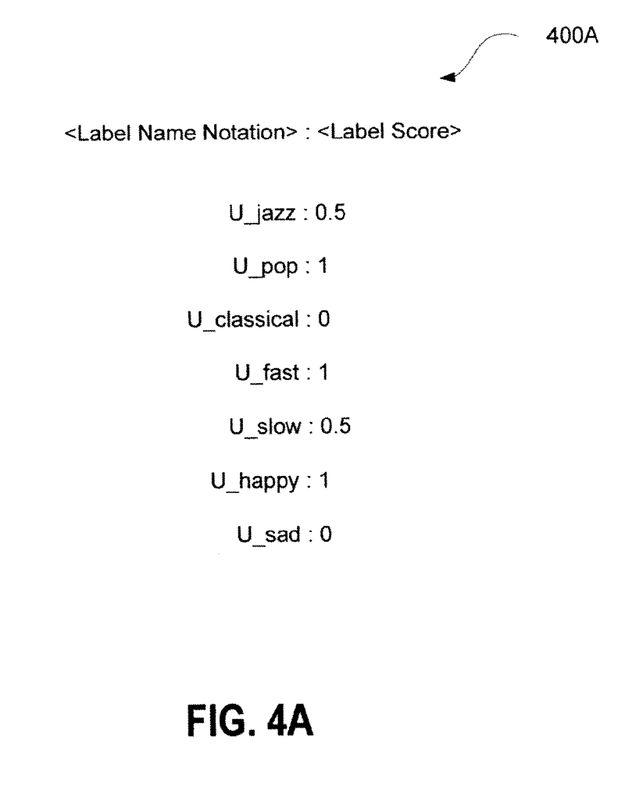
FIG. 4A illustrates a vector—associated with user U, in accordance with one embodiment of the present disclosure.

FIG. 4A illustrates a vector 400A associated with user U, in accordance with one embodiment of the present disclosure. As shown, the vector 400A includes the label name notation portion and the label score portion. In this embodiment, the following set of labels are defined for the vector 400A: "Jazz," "pop," "classical," "fast," "slow," "happy," and "sad." Each label in the vector 400A is assigned with a label score ranging from "0" to "1," with "0" representing no match and "1" representing a full match. For example, the score for the label of "jazz" in the vector 400A is "0.5," which means the user U likes jazz but not a big fan of jazz. The score for the label of "classical" is "0," which means that user U does not like classical music. The score for the label of "pop" is "1," which means that user U is a big fan of pop music. Based on the label scores shown in vector 400A, user U likes happy, fast, pop music, and sometimes likes jazz, but user U does not like classical music.

Figure 4B:
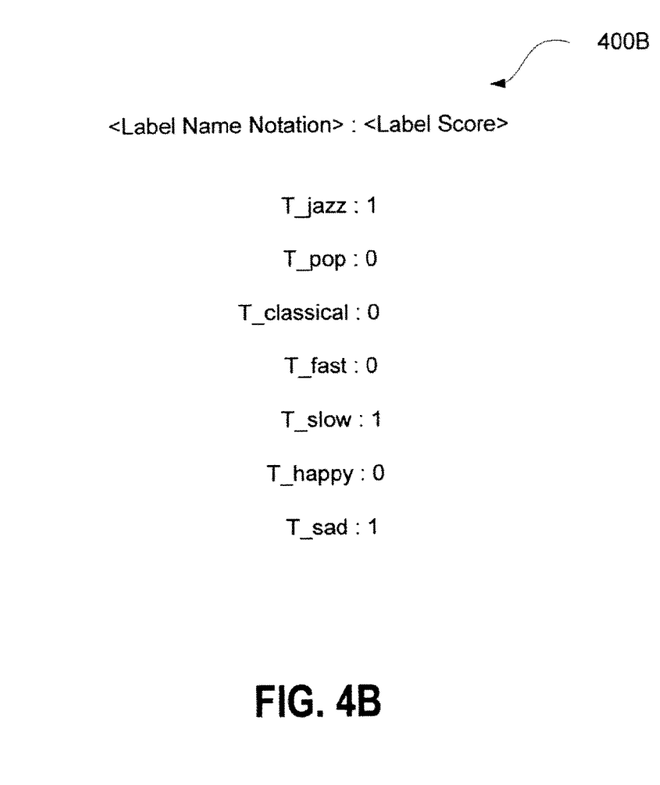
FIG. 4B illustrates a vector associated with a music track T, in accordance with one embodiment of the present disclosure.

FIG. 4B shows a vector 400B associated with a music track T, in accordance with one embodiment of the present disclosure. Similar to the vector 400A shown in FIG. 4A, the vector 400B includes the label name notation portion and the label score portion. In this embodiment, the following set of labels are defined for the vector 400B: "Jazz," "pop," "classical," "fast," "slow," "happy," and "sad," and each label in the vector 400B is assigned with a label score. Based on the label scores of the vector 400B, the music track T is a slow melancholy jazz track.

As noted above, various methods, math operations, or comparisons between vectors can be used to compute similarity or degree of match. One example way to compute the degree of match between user U and track T may be measured by computing the cosine similarity between the vector 400A for user U and vector 400B for track T:

$$\text{dot}(U, T)/\text{norm}(U)*\text{norm}(T)$$

where dot (U, T)=U_jazz*T_jazz+U_pop*T_pop+U_classical*T_lcassical+U_fast*T_fast+U_slow*T_slow+U_happy*T_happy+U_sad*T_sad and norm (U)=sqrt(dot(U, U)) norm(T)=sqrt(dot(T, T))

The greatest match between the two vectors is when the cosine similarity computation generates a score of "1" and the least match between two vectors is when the cosine similarity computation generates a score of "0." Based on the label scores of the vector 400A and the vector 400B, the cosine similarity generates a comparison result, or score, of 1/(1.87*1.732)=0.3086. This is a relatively low match between user U and track T.

For entities having multiple associated vectors, the similarity between two entities is defined as the maximum match between any of the vectors of one entity with any of the vectors of another entity. For example, each of the entity A and entity B is associated with multiple vectors. The similarity between entity A and entity B may be defined as $$\text{match}(A,B)=\max_{\{i,j\}}\text{cosine-similarity}(A\_i, B\_j)$$

where A_i indexes the ith vector of the entity A and B_j indexes the jth vector of the entity B.

The above-discussed maximum match operation works under the assumption that the two entities should match better with respect to one of their vectors that defines the music "senses" for the entities. For example, if an artist is associated with two vectors: one for pop-oriented music and another for folk-oriented music, and a user is associated with three vectors: one for classical music, one for pop music, and one for rock music, the artist's pop-oriented vector may match well with the user's pop-oriented vector. In this case, the score of matching the artist with respect to the user's particular classical music interests in not relevant, which may be effectively filtered out by the maximum match operation.

Figure 5:
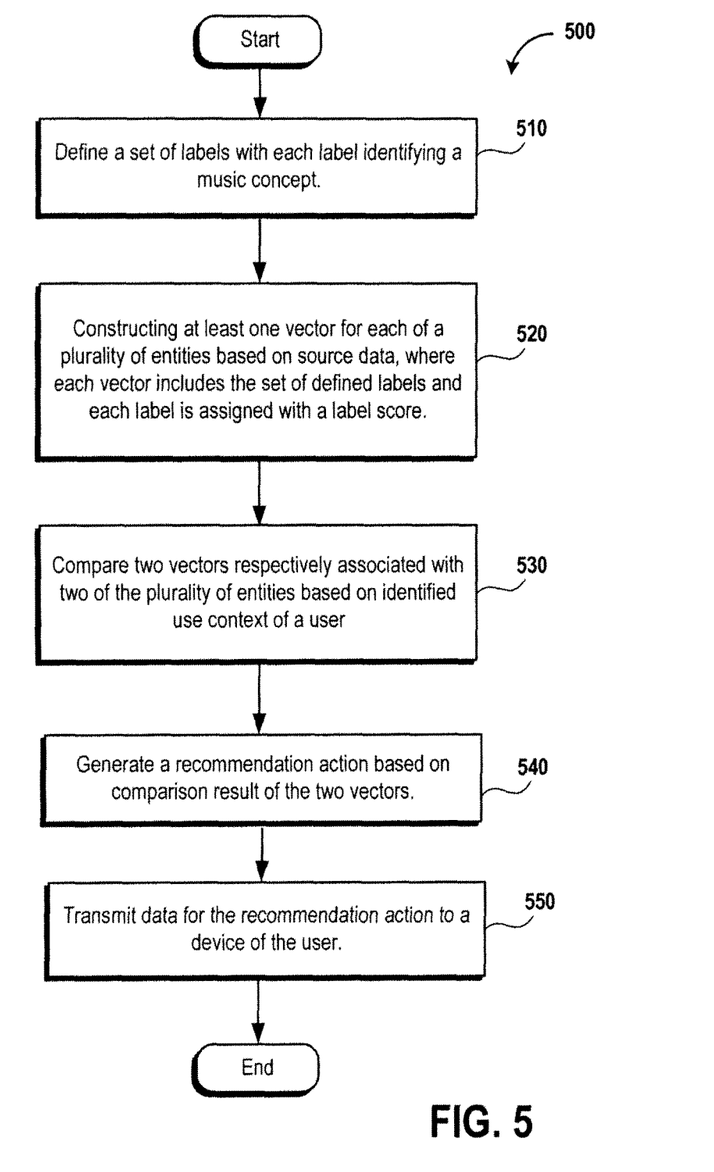
FIG. 5 illustrates a flow diagram of an exemplary method for recommending musical entities for a user, in accordance with one embodiment of the present disclosure.

FIG. 5 illustrates a flow diagram of an example method 500 for recommending musical entities, in accordance with one embodiment of the present disclosure. In one embodiment, the illustrated exemplary method 500 is described in relation to operations performed by the music provider logic 114, as shown in FIG. 1 and FIG. 3. As used herein, the term "music provider logic" is used to connote a system that can manger the musical entities recommendation functionality for users. As such, so long as the functionality is provided, the name music provider logic 114 is only used for purposes of explaining the functional aspects of the embodiments.

In operation 510, a set of labels is defined with each label identifying a music concept. In one embodiment, the set of defined labels is stored in the label dictionary 340 as illustrated in FIG. 3. In one embodiment, the set of labels are defined for the musical entities by (a) choosing a fixed set of labels for each entity by one or more users based on a unison agreement, (b) choosing an unique set of labels based on tags entered by one or more users for each entity, (c) choosing labels based on the number of collected tags from various documents according to certain defined criteria; (d) choosing labels by using a combination of (a), (b), and (c), and other methods.

In operation 520, for each entity, at least one vector is constructed based on the source data. In one embodiment, each constructed vector includes the set of labels defined in operation 510 with each label being assigned with a label score. The label scores may be (e) assigned manually by a user, (f) assigned based on the occurrence of a pre-defined event collected from a group of documents, (g) predicted based on the occurrence of a pre-defined event by using a machine leaning model, or (h) assigned by using a combination of (e), (f), and (g).

In one embodiment, the source data is obtained from the data stored in the user records and the music records, with the user records stored in the user database 318 of the music manager server 310 and the music records stored in the music database 319 of the music manager server 310. In one embodiment, each user is associated with a user record and each music track, album, or artist may be associated with one music record.

In operation 530, to identify the similarity between the two entities, two vectors respectively associated with the two entities are compared. In one embodiment, the comparison is made at the time the user is accessing the music site, and the current content of the user's actions can be analyzed. If the user is listening to classical music, this content can be used to select the user's classical music vector, which will be used to provide the user with recommendations regarding other classical music songs that may be of interest to listen to or buy. In one embodiment, the identified use context of a user is user activities performed by the user at a current point in time, historically, or recently. In one embodiment, a user's activities may result in one or more seed tracks, one or more seed albums, one or more seed artists, or a given user music profile.

In one embodiment, the comparison of two vectors may be performed by the recommendation framework 312 of the music manager server 310 after obtaining the associated vectors from the vector database 320, as illustrated in FIG. 3. In one embodiment, the similarity between the two entities may be measured by computing the cosine similarity between the two vectors respectively associated with the two entities. In another embodiment, a normalization process may be performed before computing the cosine similarity. Based on the comparison result or score, a score of "1" means that the two entities are very similar and a score of "0" means that the two entities are dissimilar. It is to be understood that other similarity measures other than cosine similarity may be used, for example, dot product, Euclidean distance, L−1 distance, etc.

In one embodiment, an entity identifies a user, a track, an album, an artist, etc. Because all entities are embedded, i.e., represented in the same vector space (e.g., same number of dimensions), any type of comparison is possible. For example, an entity that identifies a user may be compared with an entity that identifies a track. Similarly, an entity that identifies an artist may be compared with another entity that identifies another artist; an entity that identifies an album may be compared with another entity that identifies another album, and so on.

In operation 540, a recommendation action is generated based on the comparison result of the two vectors respectively associated with the two entities. In one embodiment, the recommendation action is generated by the recommendation framework 312 of the music manager server 310 as illustrated in FIG. 3.

The recommendation action may be a list of tracks, or a playlist, based on one or more seed tracks. In another embodiment, the recommendation action is a list of artists, based on one or more seed artists. In yet another embodiment, the recommendation action is a list of albums, based on one or more seed albums. In still yet another embodiment, the recommendation action is a list of artists, albums, or tracks, based on a given user music profile. For example, the given user music profile may be obtained from a user record stored in the user database 318 of the music manager server 310.

In operation 550, the data for the recommendation action is transmitted back to a device of the user. For example, as illustrated in FIG. 3, the generated recommendation action 376 may be transmitted to user A device 370 to be displayed at the device screen 375.

Figure 6:
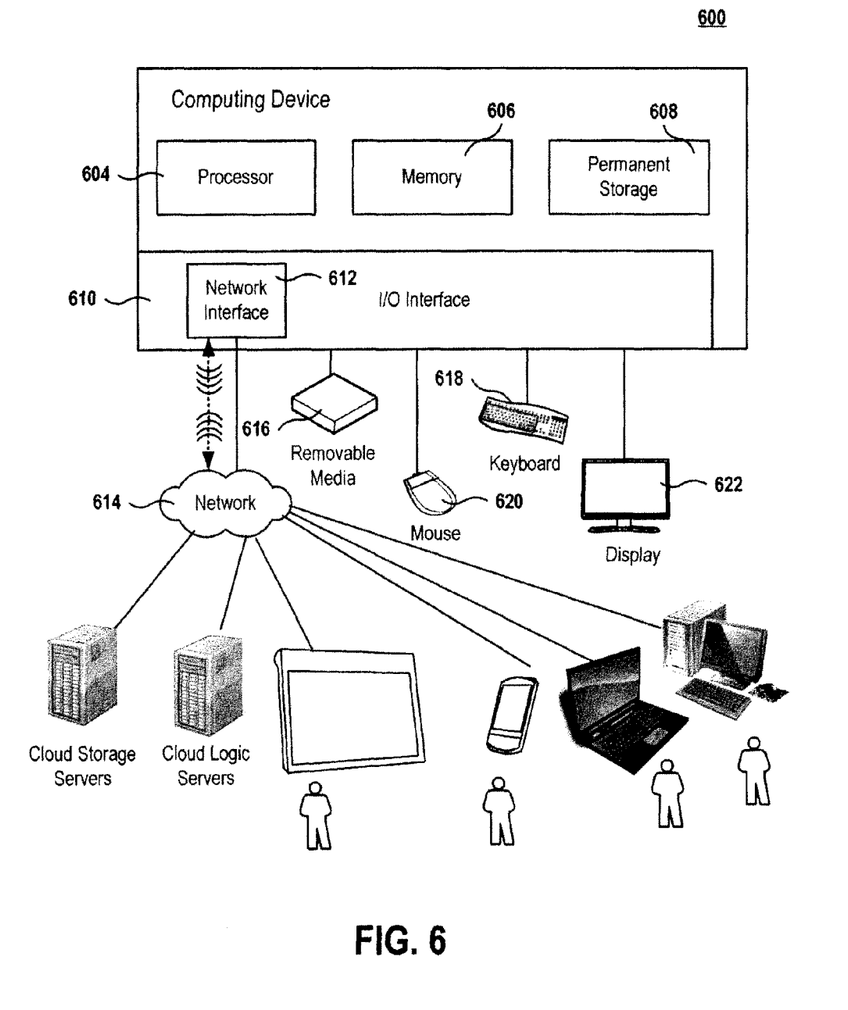
FIG. 6 is a simplified schematic diagram of a computer system for implementing embodiments of the present disclosure.

FIG. 6 is a simplified schematic diagram of a computer system 600 for implementing embodiments of the present disclosure. FIG. 6 depicts an exemplary computer environment for implementing embodiments of the disclosure. It should be appreciated that the methods described herein may be performed with a digital processing system, such as a conventional, general-purpose computer system. Special purpose computers, which are designed or programmed to perform only one function, may be used in the alternative. The computer system 600 includes a processor 604, which is coupled through a bus to memory 606, permanent storage 608, and Input/Output (I/O) interface 610.

Permanent storage 608 represents a persistent data storage device such as a hard drive or a USB drive, which may be local or remote. Network interface 612 provides connections via network 614, allowing communications (wired or wireless) with other devices. It should be appreciated that processor 604 may be embodied in a general-purpose processor, a special purpose processor, or a specially programmed logic device. Input/Output (I/O) interface 610 provides communication with different peripherals and is connected with processor 604, memory 606, and permanent storage 608, through the bus. Sample peripherals include display 622, keyboard 618, mouse 620, removable media device 616, etc.

Display 622 is configured to display the user interfaces described herein. Keyboard 618, mouse 620, removable media device 616, and other peripherals are coupled to I/O interface 610 in order to exchange information with processor 604. It should be appreciated that data to and from external devices may be communicated through I/O interface 610. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 608, network attached storage (NAS), read-only memory or random-access memory in memory module 606, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Additionally, FIG. 6 shows various types of devices that can connect to the network, such as the internet. The devices include servers, tablet computers, smartphones, laptops, desktops, etc. The various devices run operating systems and the operating systems can vary from manufacturer to manufacturer.

Some, or all operations of the method presented herein are executed through a processor, such as processor 604 of FIG. 6. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method for recommending musical entities to a user, comprising:
    defining a set of labels with each label identifying a music concept;
    constructing at least one vector for each of a plurality of entities based on source data, wherein each vector includes the set of defined labels and each label is assigned a label score, and an album vector for at least two of the plurality of entities which each have a respective vector;
    comparing two vectors respectively associated with two of the plurality of entities;
    generating a recommendation action based on comparison result of the two vectors; and
    transmitting data for the recommendation action to a device of the user, wherein the method is executed by a processor.

2. The method of claim 1, wherein the comparing of the two vectors includes,
    computing cosine similarity for the two vectors respectively associated with the two of the plurality of entities.

3. The method of claim 2, wherein the comparing of the two vectors further includes,
    performing normalization to each label score before the computing of the cosine similarity.

4. The method of claim 2, wherein the comparing of the two vectors further includes,
    performing a maximum match operation for the two vectors respectively associated with the two of the plurality of entities, wherein each of the two of the plurality of entities has multiple vectors.

5. The method of claim 1, wherein the comparing of the two vectors respectively associated with two of the plurality of entities is based on identified use context of the user.

6. The method of claim 5, wherein the identified use context of the user is obtained from user activities performed by the user.

7. The method of claim 6, wherein the user activities result in one or more seed tracks, one or more seed artists, one or more seed albums, or a music profile of the user.

8. The method of claim 7, wherein the recommendation action is an artist, a list of artists, an album, a list of albums, or a track, a list of tracks, or a combination thereof.

9. The method of claim 1, wherein the defining of the set of labels includes
    (a) choosing a fixed set of labels for each entity by one or more users based on a unison agreement;
    (b) choosing an unique set of labels based on tags entered by one or more users for each entity;
    (c) choosing labels based on number of collected tags from various documents according to defined criteria; or
    (d) choosing labels by using a combination of (a), (b), and (c).

10. The method of claim 1, wherein the label score is
    (e) manually assigned;
    (f) assigned based on occurrence of a pre-defined event collected from a group of documents;
    (g) predicted based on occurrence of a pre-defined event by using a machine leaning model; or
    (h) assigned by using a combination of (e), (f), and (g).

11. The method of claim 1, wherein the source data is obtained from data stored in user records and music records.

12. The method of claim 11, wherein each of the user records includes a user music profile portion and a use metrics portion.

13. The method of claim 11, wherein each of the music records store data representing a track, an artist, or an album.

14. The method of claim 13, wherein the track, the artist, or the album is stored in a music library of the user and/or an online music store.

15. The method of claim 1, further comprising:
    detecting a login at the user's account before the comparing of the two vectors.

16. The method of claim 1, further comprising:
    pre-generating a comparison of a plurality of vector pairs for use in presenting the recommendation action to users accessing a music service account, the recommendation action including recommendation of particular songs, albums, tracks, composers, artists, or a combination thereof.

17. The method of claim 1, wherein each of the plurality of entities identifies a user, a track, an album, or an artist.

18. The method of claim 1, wherein the comparing is performed in advanced for a plurality of vectors to generate comparison results, the comparison results being usable to produce recommendation actions before, during or after user access to a music service is detected.

19. A system of recommending musical entities to a user, comparing:
    a vector constructor configured to construct at least one vector for each of a plurality of entities based on source data, wherein each vector includes a set of defined labels with each label identifying a music concept and being assigned a label score, and an album vector for at least two of the plurality of entities which each have a respective vector;
    a recommendation framework configured to
        compare two vectors respectively associated with two of the plurality of entities, and
        generate a recommendation action based on comparison result of the two vectors; and
    at least one processor configured to execute the vector constructor and the recommendation framework.

20. The system of claim 19, further comprising:
    a use context configured to collect user activities of the user.

21. The system of claim 19, further comprising:
    a label dictionary configured to store the set of defined labels.

22. The system of claim 19, further comprising:
    a vector database configured to store the constructed vectors.

23. A computer readable non-transitory media having program instructions for recommending musical entities to a user, the computer readable non-transitory media comprising:

program instructions for defining a set of labels with each label identifying a music concept;
   program instruction for constructing at least one vector for each of a plurality of entities based on source data, wherein each vector includes the set of defined labels and each label is assigned a label score, and an album vector for at least two of the plurality of entities which each have a respective vector;
   program instruction for comparing two vectors respectively associated with two of the plurality of entities;
   program instruction for generating a recommendation action based on comparison result of the two vectors; and
   program instruction for transmitting data for the recommendation action to a device of the user.

* * * * *